(12) United States Patent
Booton (10) Patent No.: US 8,433,045 B2
(45) Date of Patent: Apr. 30, 2013

(54) COMPUTER TELEPHONY SYSTEM, METHOD AND SERVER

(75) Inventor: Laurance J Booton, Woodbridge (GB)

(73) Assignee: British Telecommunications Public Limited Company, London (GB)

(*) Notice: Subject to any disclaimer, the term of this patent is extended or adjusted under 35 U.S.C. 154(b) by 1134 days.

(21) Appl. No.: 12/282,577

(22) PCT Filed: Feb. 27, 2007

(86) PCT No.: PCT/GB2007/000683
§ 371 (c)(1),
(2), (4) Date: Sep. 11, 2008

(87) PCT Pub. No.: WO2007/110570
PCT Pub. Date: Oct. 4, 2007

(65) Prior Publication Data
US 2009/0097621 A1  Apr. 16, 2009

(30) Foreign Application Priority Data
Mar. 24, 2006 (EP) .................................. 06251621

(51) Int. Cl.
*H04M 11/00* (2006.01)
(52) U.S. Cl.
USPC ............... 379/93.02; 379/201.01; 379/265.04
(58) Field of Classification Search ............... 379/93.02, 379/265.04, 201.01
See application file for complete search history.

(56) References Cited

U.S. PATENT DOCUMENTS

| 6,594,357 B1 * | 7/2003 | Emerson et al. ......... 379/265.04 |
| 7,899,168 B2 * | 3/2011 | Raghav et al. ........... 379/201.01 |
| 2004/0066926 A1 | 4/2004 | Brockbank et al. |
| 2009/0067597 A1 | 3/2009 | Booton |

FOREIGN PATENT DOCUMENTS

| EP | 1068717 | 1/2001 |
| WO | 96/31044 | 10/1996 |
| WO | 2006/070187 | 7/2006 |
| WO | 2006/070187 A1 | 7/2006 |
| WO | WO2007/063275 | 6/2007 |

OTHER PUBLICATIONS

International Search Report for PCT/GB2007/000683, mailed Jun. 19, 2007.

(Continued)

*Primary Examiner* — Simon Sing
*Assistant Examiner* — Van D Huynh
(74) *Attorney, Agent, or Firm* — Patterson Thuente Pederson, P.A.

(57) ABSTRACT

A computer telephony system allows a user to control different communications terminals at different times via a second system, external to the computer telephony system. The computer telephony system comprises a plurality of communications terminals each of which has an identifier. The computer telephony system further comprises means for generating a key and for recording internally a mapping linking the key and the identifier of a first communications terminal and means for changing the mapping, on a request by the user, so as to link the key with a second communications terminal. In operation, the key is provided to a second system, external to the computer telephony system and accessible by the user. According to one aspect, the computer telephony system further comprises means for issuing a computer telephony message comprising the identifier of the first communications terminal to a communications controller in response to receiving from the second system the key and a computer telephony command provided to the second system from the user.

21 Claims, 2 Drawing Sheets

OTHER PUBLICATIONS

International Search Report and Written Opinion of the International Searching Authority dated Jun. 26, 2007 in PCT/GB2007/000671.
European Search Report dated Sep. 29, 2006 in EP 06251586.1.
U.S. Appl. No. 12/282,719, filed Sep. 12, 2008.
Written Opinion of the International Searching Authority dated Jun. 19, 2007 in PCT/GB2007/000683.
European Search Report dated Sep. 29, 2006 in EP 06251621.6.
A. Catchpole, G. Crook, and D. Chesterman, "Introduction to Computer Telephony Integration," British Telecommunications Engineering, Jul. 1995.
A. Catchpole, "Computer Telephony Integration—The Meridian Norstar," British Telecommunications Engineering, Oct. 1995.
P. Johnson, A. Catchpole, and L. Booton, "Computer Telephony Integration—The Meridian 1 PBX," British Telecommunications Engineering, Jul. 1996.
G. Hillson, G. Hardcastle, and M. Allington, "Callscape—Computer Telephony Integration for the Small Business," British Telecommunications Engineering, Jan. 1997.
M. Bonner, British Telecommunications Engineering, "Call Centres—Doing Business by Telephone," Jul. 1994.
Application and File History for U.S. Appl. No. 12/282,719, filed Sep. 12, 2008, inventor Booton.

* cited by examiner

COMPUTER TELEPHONY SYSTEM, METHOD AND SERVER

This application is the U.S. national phase of International Application No. PCT/GB2007/000683 filed 27 Feb. 2007 which designated the U.S. and claims priority to EP 06251621.6 filed 24 Mar. 2006, the entire contents of each of which are hereby incorporated by reference.

This invention relates to computer telephony integration (CTI) and to a system and method providing for control of a communications terminal in a computer telephony system.

Computer telephony allows a user to control, from their networked computer terminal, telephony activity related to a telephony terminal nominated by the user: typically the telephone on their desk. The kind of telephony activity controlled in this way typically includes the initiation of calls from the telephone and the logging of calls to/from the telephone (i.e. allowing the user to redial outgoing calls or to respond to missed calls).

Examples of computer telephony environments are disclosed in the articles "Introduction to Computer Telephony Integration", by A. Catchpole, G. Crook, and D. Chesterman, British Telecommunications Engineering, July 1995; "Computer Telephony Integration—The Meridian Norstar", by A. Catchpole, British Telecommunications Engineering, October 1995; "Computer Telephony Integration—The Meridian 1 PBX", by P. Johnson, A. Catchpole, and L. Booton, British Telecommunications Engineering, July 1996; "Callscape—Computer Telephony Integration for the Small Business", by G. Hillson, G. Hardcastle, and M. Allington, British Telecommunications Engineering, January 1997, and "Call Centres—Doing Business by Telephone" by M. Bonner, British Telecommunications Engineering, July 1994.

Computer telephony is particularly useful in call centres, and International Application Number PCT/GB96/00727 (Publication Number WO 96/31044) in the name of British Telecommunications public limited company discloses an automatic call distribution (ACD) suite in a call centre such as BT's national telephone account management operation.

Computer telephony is also a valuable contribution to the digital networked economy adding integrated telephony functionality to email and other electronic communications in the modern, networked organisation. To support computer telephony, the Click Dial (CD) service from British Telecommunications allows the secure registration of a telephony terminal with a computer terminal by means of a cookie. This CD cookie, generated by BT's computer telephony system "iBridge" via a secure registration technique, is an encoded version of the telephone terminal identity. In order to change the associated telephony terminal, re-registration is needed and a new CD cookie is generated which replaces the original. According to this system, the iBridge registration server restricts control of a telephony terminal to a user with a valid CD cookie. The only way to get a valid CD cookie is by registering with the registration server.

European patent 1068717 in the name of British Telecommunications public limited company discloses a method of registering the identity of a communications terminal in association with the identity of a computer terminal, the method comprising the steps of:
providing a user of the computer terminal, via that computer terminal, with the identity of a predetermined destination terminal number; answering a call made to that predetermined destination terminal number; receiving at that predetermined destination terminal number the identity of a communications terminal from which that call was made; providing to the user, via that computer terminal, a codeword; receiving, at that predetermined destination terminal, data provided by the user via that telephone terminal; comparing the received data with the provided codeword; and if there is a match, registering the identity of that communications terminal in association with the identity of that computer terminal.

The above patent also discloses a system for registering the identity of a communications terminal in association with the identity of a computer terminal, the system comprising:—
means to provide to a user of the computer terminal, via that computer terminal, the identity of a predetermined destination terminal number; means to answer a call made to that predetermined destination terminal number; means to receive the identity of a telephone terminal from which that call was made; means to provide to the user, via that computer terminal, a codeword; means to receive data provided by the user via that telephone terminal; means to compare the received data with the provided codeword; and means responsive to a match between the received data and the provided codeword to register the received identity of that telephone terminal in association with the identity of that computer terminal. Once the correct association has been established between the computer terminal and the telephone terminal, the web browser used to interact with the registration server delivers a "cookie" to the computer. The CD cookie holds the information needed to associate the computer and telephone.

Computer telephony may be exercised via a third-party system, such as an email/web server. Microsoft OC is a client that, working through the Microsoft LCS server, can allow the user to gain control, via the BT iBridge computer telephony system, of a telephony terminal connected to a PBX, however, this system provides no security as to which telephony terminal the user actually controls. As a result, the user could inadvertently or maliciously originate calls from a telephony terminal allocated to another user.

If the user changes desk, i.e. moves to another phone, then a re-registration would be required, and a new registration key sent to the Microsoft environment.

The above arrangement is very effective in adding security to computer telephony operations carried out via a third-party system, such as the Microsoft environment. However, every time a re-registration occurs, the registration key needs to be re-written to the third-party system. There is a time delay in the registration key rippling through all the various Microsoft systems, which can result in the user remaining in control of their original DN and not obtaining control over their new DN for a period of time following completion by the user of the re-registration process. There is a need to allow the user to change telephones quickly and efficiently whilst enjoying the flexibility to initiate computer telephony activity via a third-party system.

All references to earlier documents are given here for the purposes of providing background to the present invention and are not to be taken as an indication that the content of these documents constitutes common general knowledge.

The invention relates to control of a communications terminal in a computer-telephony integration (CTI) system. The present invention allows flexible control at different times of the operation of a number of communications terminals via third-party systems such as the Microsoft Live Communications Server (LCS) Office Communicator (OC) system while maintaining security from inadvertent or malicious misuse.

The present invention provides a method of operating a computer telephony controller in a computer telephony system comprising a plurality of communications terminals in which each communications terminal has an identifier; the method including the steps of: generating in the computer telephony controller a key and providing the key to a second system external to the computer telephony system and accessible by a user; recording in the computer telephony controller a mapping linking the key and the identifier of a first communications terminal; in which the first communications terminal is associated with a user; on a request from the user, changing the mapping so as to link the key with the identifier of a second communications terminal; so that a user may exercise control over different selected communications terminals at different times via the second system.

According to an aspect of the invention, the method includes the steps of receiving a message from the second system in which the message comprises a command issued by the user and the key; reading the key received in the message; retrieving the identifier linked to the received key; and forwarding the command and the identifier to a communications controller for controlling operation of the communications terminal The present invention also provides a computer telephony system comprising a plurality of communications terminals, in which each communications terminal has an identifier; in which the computer telephony system also comprises means for generating a key and for recording a mapping linking the key and the identifier of a first communications terminal; in which the computer telephony system also comprises means for providing the key to a second system external to the computer telephony system and accessible by a user; and means for changing the mapping on a request by the user so as to link the key with a second communications terminal; so as to allow the user to control different communications terminals at different times via the second system.

According to an aspect of the invention, the computer telephony system comprises means for receiving a message from the second system in which the message comprises a command issued by the user and the key; reading the key received in the message; retrieving the identifier linked to the received key; and forwarding the command and the identifier to a communications controller for controlling operation of the communications terminal.

According to further aspects of the invention, the attributes of the key are selected so that it is suitable to be processed by the second system as a communications terminal identifier; and/or so that it is suitable to be stored in a directory number database in the second system; a second key is generated and provided to the computer terminal and a mapping linking the second key and the identifier of the first communications terminal is recorded in the computer telephony system. According to a further aspect, entry of the key into a database record in the second system relating to a user, denotes the user as enabled for computer telephony.

The present invention also provides a method of operating a computer telephony controller in a computer telephony system comprising a plurality of communications terminals in which each communications terminal has an identifier; the method including the steps of: generating one or a plurality of keys and providing the key or keys to a plurality of systems external to the computer telephony system and accessible by a user; recording in the computer telephony controller a mapping linking the key or keys and the identifier of a first communications terminal; on a request from the user, changing the mapping so as to link the key or keys with the identifier of a second communications terminal; so that a user may exercise control over different selected communications terminals at different times via the external systems.

According to an aspect of the invention, the method includes the steps of receiving from one of the external systems the key or one of the keys, as the case may be, and a command provided to the external system from the user and issuing to a communications controller the command and the identifier of the first or second communications terminal, as the case may be.

According to further aspects of the invention, the key is suitable to be processed as a communications terminal identifier by the second system; and/or is suitable to be stored in a directory number database in the second system; the computer telephony system includes means for receiving the key from the second system and identifying in the computer telephony system the first or the second communications terminal, as appropriate. According to a further aspect, the computer telephony system comprises means for generating a second key and for recording in the computer telephony system a mapping linking the second key and the identifier of a first communications terminal; and means for providing the second key to the computer terminal.

The present invention also provides a method of operating a computer telephony controller in a computer telephony system comprising a communications controller and a plurality of communications terminals in which each communications terminal has an identifier; the method including the steps of generating in the computer telephony controller a key and providing the key to a second system external to the computer telephony system and accessible by a user; recording in the computer telephony controller a mapping linking the key and the identifier of a first communications terminal; in which the first communications terminal is associated with a user; on a request from the user, changing the mapping so as to link the key with the identifier of a second communications terminal; the method including the steps of receiving a message from the second system in which the message comprises a command issued by the user and the key; reading the key received in the message; retrieving the identifier linked to the received key; and forwarding the command and the identifier to the communications controller for controlling operation of the communications terminal.

The present invention also provides a server for communicating with a communications controller in which the server comprises means for receiving a key linked to the identifier of a first communications terminal; in which the server also comprises means for receiving from a user a computer telephony command and means for forwarding the command with the key to the communications controller so that the user is able to control the communications terminal via the server.

The present invention also provides a computer telephony controller for communicating with a communications controller as part of a computer telephony system in which the server comprises: means for generating a key and for recording a mapping linking the key and the identifier of a first communications terminal; means for providing the key to a second system external to the computer telephony system and accessible by a user; and means for changing the mapping on a command by the user so as to link the key with a second communications terminal; so as to allow the user to control different communications terminals at different times via the second system.

The present invention also provides a communications system comprising the server or computer telephony system as claimed.

The invention will now be described by way of example only with reference to the drawings. The embodiments described include the best mode known to the inventor.

The FIGS. 1 and 2 show schematically computer telephony systems according to embodiments of the invention.

Figure 1:
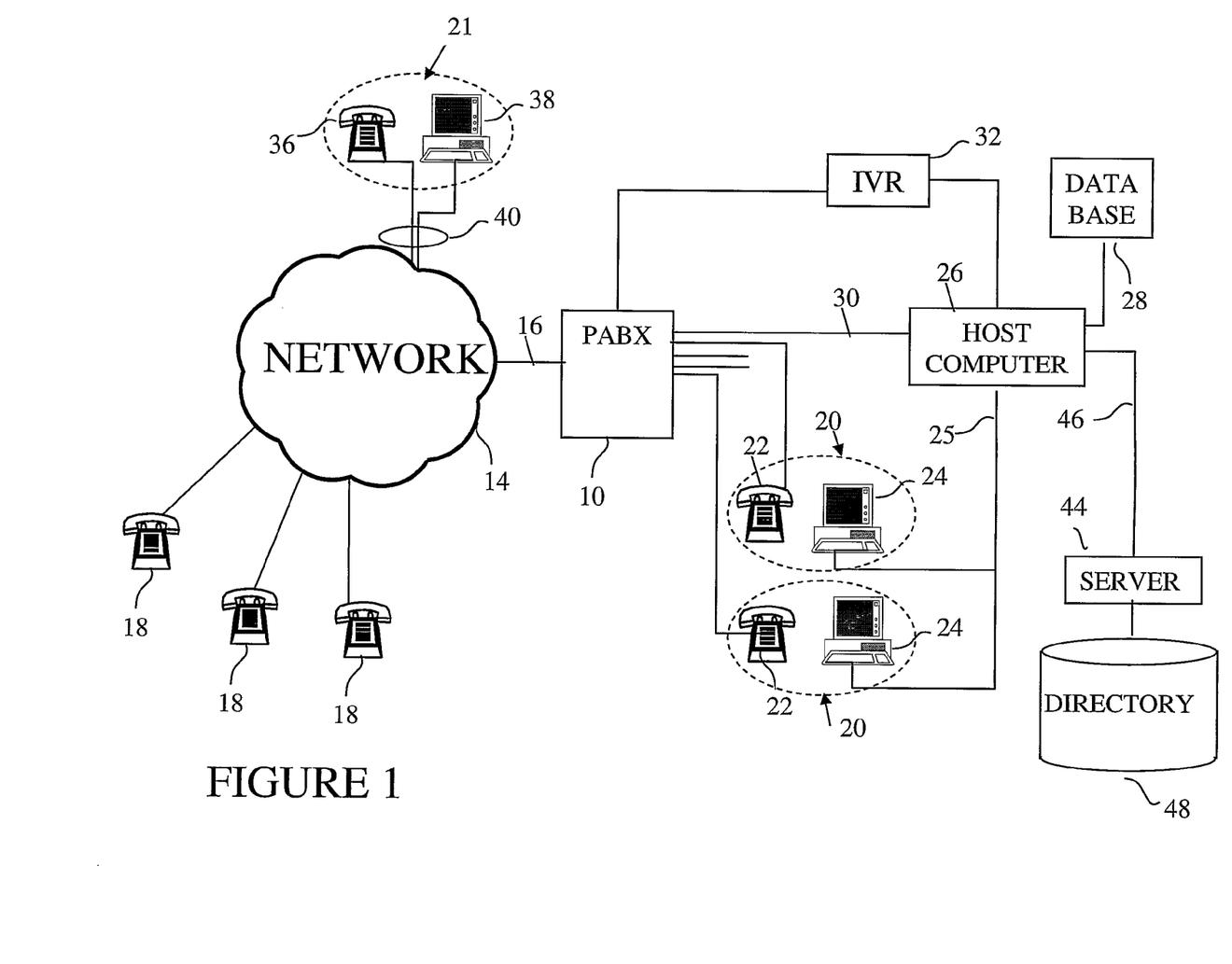

The FIG. 1 shows a computer-telephony system suitable for implementing the present invention and comprising the following main components. A communications switch 10, typically a PBX, is connected to a plurality of internal telephony terminals 22, typically extensions to the PBX. The communications switch 10 may also be connected to an external communications network 14, itself with a number of external telephony terminals 18. Typically, the networks and terminals will be capable of handling voice telephony calls. Users of the internal communications network, represented by telephony terminals 22, can make calls via the communications switch to other internal or external telephony terminals by dialling the published directory number (DN) of the desired destination telephony terminal. These calls are received at the communications switch 10 and routed to the desired destination, if accessible.

Whenever a call is made via the communications switch 10 from an internal telephony terminal, the switch receives a code identifying the calling telephony terminal. This code is known as the calling line identity (CLI). The CLI may be used inside the communications switch 10 and may be passed to the destination to allow the called party to know the origin of the call. Typically, the CLI contains the directory number (DN) of the calling telephony terminal.

Each user of an internal telephony terminal also has access to and use of a computer terminal 24. Each telephone terminal 22 can be combined with a computer terminal 24 to form a user workstation 20, as indicated in the Figure by a dashed line enclosing the two. Computer terminals 24 are arranged in communication with the host computer 26 or second server 44, e.g. via a local area network (LAN) 25, 46. The host computer 26 corresponds to the iBridge server in the BT iBridge computer telephony system. Each computer terminal 24 is provided with software to support interaction with the host computer for controlling and using telephony functions. Second server 44 and associated directory database 48 comprise a third-party system, i.e. external to the computer telephony system based on host computer 26 and communications switch (PBX 10). Directory database 48 stores user-related information including user contact details such as the directory number (DN) of the user's telephony terminal and the user's email address.

Host computer 26 has an associated database store 28 and is connected to the communications switch 10 via computer-telephony link 30. By this means, a user has the possibility to send from their computer terminal commands to the communications switch for controlling, via the switch, the operation of the user's internal telephony terminal. There is a need in such computer telephony systems to ensure that a user is only granted control over a telephone that they are able to and entitled to use, i.e. a telephone situated close to the user. External user's also have access to host computer 26. External workstation 21 comprises communications terminal 36 and computer terminal 38. A user at remote workstation 21 can make calls via public communications network 14, communications links 16, 40 and communications switch (PBX 10) to internal communications terminals 22 and IVR system 32 by dialling a published directory number for the desired destination. Communications link 40 is capable of supporting voice and data communication over different channels, such as in an ISDN link. The remote user activates computer terminal 38 which autodials the directory number of the host computer 26. When a connection (using one of the B channels) has been established via the ISDN link 16, the remote user logs on to host computer 26 using an identification protocol including informing the host computer 26 of the directory number being currently used by the remote user, and the host computer 26 will store the remote user's directory number in association with the identity of remote user. Alternatively, if the remote user only has rights to log on from a fixed location, the remote user does not inform the host computer 26 of the identity of the remote terminal and the host computer 26 refers to the remote user's record in database 28 and retrieves the appropriate data. Once logged on the remote user is able to interact with host computer 26 in a similar way to local users at computer terminals 24.

Registration of a telephone so as to grant the user control over it is achieved as follows. Interactive voice response system (IVR) 32 also is connected to a port of the communications switch 10 and to the host computer 26. The IVR system is allocated one or more directory numbers (DN) and the user may make a call to the IVR system in a similar way as to any of the telephony terminals 22. The IVR system is arranged to obtain data from callers who call a directory number allocated to the IVR system and to pass this data to the host computer 26 for processing, as appropriate. In FIG. 1, only two internal telephony terminals 22 are shown for clarity although there may in reality be hundreds or thousands of users each with an internal telephony terminal connected to a single switch/server combination.

The user also has access via their computer terminal 24 and host computer 26 to a second server 44 for data processing and office automation tasks, including email, internet access and instant messaging. According to an alternative embodiment, the user accesses the host computer via the second server and network connection 46 between the two.

An individual registering for the computer telephony service may do so by performing any of the methods described in the applicant's earlier applications, as set out above. A further example of a suitable registration process is given next.

Operation of the above computer telephony system will now be described in detail. According to the embodiment described here, the third party system comprises a Microsoft LCS running on second server 44 and Active Directory comprised in directory database 48.

1. A user, via a browser on their PC 24, accesses an iBridge Registration web page hosted by the iBridge server 26. The web page contains the phone number DN of the IVR 32 system, and a random code word generated by the iBridge server
2. The user dials the number of the IVR given on the registration web page from the telephone 22 the user wishes to register. The IVR system is programmed to respond to such calls by prompting the user for the code word provided to the user by the host computer and also by obtaining, in known fashion, the CLI and hence the DN of the telephony terminal used to make the call. The user is able to enter the code word as DTMF digits on the key-pad of the telephony terminal. The IVR system passes the digits received from the user in response to the prompt for the code word and the DN derived from the CLI to the iBridge Server.
3. The iBridge Server compares the digits received from the IVR to the code word it displayed on the web page. If they match, it identifies the DN of the user's telephone 22 from the CLI received from the IVR.
4. The first time the user performs a registration, a registration key is generated. The DN of the phone 22 is then written to the iBridge server data base 28 alongside the registration key. The record written to the iBridge server database would be of the form:

iBridge UserName: laurie
    DN: 697733
    RegistrationKey: 1A2B3C4D5E6F7G
    Cookie: 8263904739347459373937490478439

The cookie field is optional, as explained later. It is necessary to notify the third-party system of the link between the registration key and the user and one way to do this is to refer to a user identifier familiar to the third-party when transferring the registration key. One such identifier would be a user name known to the third-party system (AD username). This could be included in the iBridge record in addition to or instead of the iBridge username. In the latter case, the record written to the iBridge Server Database which would be of the form:
AD UserName: laurie.booton
    DN: 697733
    RegistrationKey: 1A2B3C4D5E6F7G
    Cookie: 8263904739347459373937490478439

Alternatively, some other form of user identifier, recognised by the third-party system, is referred to in transferring the registration key. For example: a user's national insurance number may form part of the user's record stored on the third-party system and could then be used by iBridge to identify the user to the third party system. The national insurance number would then be included as a field in the user's record in the iBridge database.

The cookie field is optional to support a further aspect of the invention in which the registration key is also written to the user's web browser on the user's computer terminal 24 (in the form of the browser cookie, shown above), to enable applications in which, the user accesses the computer telephony server direct from their computer terminal without exploiting the functionality of the third party system.

5. Apart from the internal iBridge record, the registration key is also written to the third-party system. According to the embodiment described here, the third party system comprises a Microsoft LCS running on second server 44 and Active Directory comprised in directory database 48. The registration key is written to the user's record in the third-party database e.g. to the DN field of the Active Directory. The corresponding entry would be of the form:
RegistrationKey: 1A2B3C4D5E6F7G Write access to the third party system may be achieved by exploiting the user's log-on rights, possibly asserted by means of a password challenge from the third-party system to the user.

6. This copying of the registration key to the third-party database is a one-off write that only occurs on first registration by a user. Upon receiving any registration request from a user, the iBridge system searches the database for an existing entry for that user; checking for that user's username. If the user's request is for a re-registration, the iBridge system detects that a previous record exists in the iBridge database for this user. Alternative means may be used to identify a previous registration, for example, by means of the cookie set in the user's browser. When it is verified that the user is performing a re-registration, rather than a first registration, the only effect will be to change the DN value stored in the user's iBridge database record in association with the registration key. Nothing needs to be changed in the third-party database. An optional information message might be sent to the third-party system, for the comfort of the user.

The amended record written to the iBridge Server Database would be of the form:
AD UserName: laurie.booton
    DN: 698844
    RegistrationKey: 1A2B3C4D5E6F7G
    Cookie: 8263904739347459373937490478439

Advantageously, the registration key written to the third-party database (AD) and stored in the iBridge Database is unaffected by this change of communications terminal. Also advantageous is the fact that the effect of the re-registration upon the third-party system is practically instantaneous.

The third-party system in receipt of the registration key is thereby securely enabled for computer telephony as neither the user nor the third-party system knows the encoding used to produce the registration key. This allows the user to issue computer telephony commands from their computer terminal via the third-party system without any reduction in security. Any computer telephony command received from the third-party system will quote the registration key provided by the iBridge system rather than the DN. Only when the command is received by the iBridge system is the registration key translated to the DN by the iBridge server and the DN value sent to the communications switch 10.

Another advantage of the invention is that, by writing the registration key to the third-party database (e.g. Microsoft AD), a reliable indication is provided as to whether a particular user is enabled for computer telephony. In the case of Microsoft LCS/OC, there is no reliable indication from the client that the user has telephony integration enabled. Typically, the administrator of LCS will indicate either none or all of the users as enabled for telephony. This indication will be reflected by the OC client. This may or may not be accurate as it will often be the case that only some of the users are enabled. Only the iBridge system actually knows if a user has the capability to perform telephony integration: if a successful registration has been achieved for that user, then they are judged to have the capability. iBridge writes to a specific field in the AD to indicate when a user has successfully registered. This field is accessible by the OC client and prevents the OC client displaying "telephony enabled" erroneously.

When a user of a third-party system instigates a telephony operation on their client, for example Microsoft OC running on their PC 24, this is communicated to the third-party server, for example Microsoft LCS, which forwards an appropriate computer telephony command to the Bridge system. The command from the third-party system 44 will refer to the abstract registration key. According to a preferred embodiment, the format of the registration key is chosen so that the third party system is unable to distinguish the registration key from a normal DN and, in any computer telephony message it sends to the iBridge system, will refer to the registration key assuming it to be a DN identifying a specific telephone. It is only when the message with the registration key reaches the iBridge server (host computer 26) that it is identified by the iBridge server with the DN of a specific communications terminal 22. The iBridge server translates the registration key to the appropriate DN indicated in the iBridge database 28. In response to the command, the iBridge server then proceeds to forward a command using the appropriate DN value to the communications switch (PBX 10) so as to control telephony operations relating to the selected communications terminal 22.

Conversely, when the communications switch (PBX 10) informs the iBridge server of an incoming call or other telephony event, it will do this with reference to the appropriate DN. In order to inform the Microsoft LCS Server 44, and thereby the user, of the event, the iBridge server 26 swaps the reference to the DN with reference to the corresponding registration key.

Some systems may not use the SIP URI and so an alternative identifier is required. This could be any field that is associated in the third-party system uniquely with the user. For example: a user's national insurance number may form part of the user's record stored on the third-party system. This alternative identifier could be preset in the iBridge system as the registration-key field. If this alternative identifier is included in messages from the third-party system to the iBridge system, it could be used by iBridge to identify the user to the third party system.

The present invention also applies to operation involving external communications terminals 18, 36. The remote user can log on from external computer terminal 38 to host computer 26 as described earlier. Once logged on, the external user has full access to the computer telephony system including the ability to register with the iBridge system and to issue computer telephony commands for processing by iBridge as described in the earlier embodiments, above.

Figure 2:
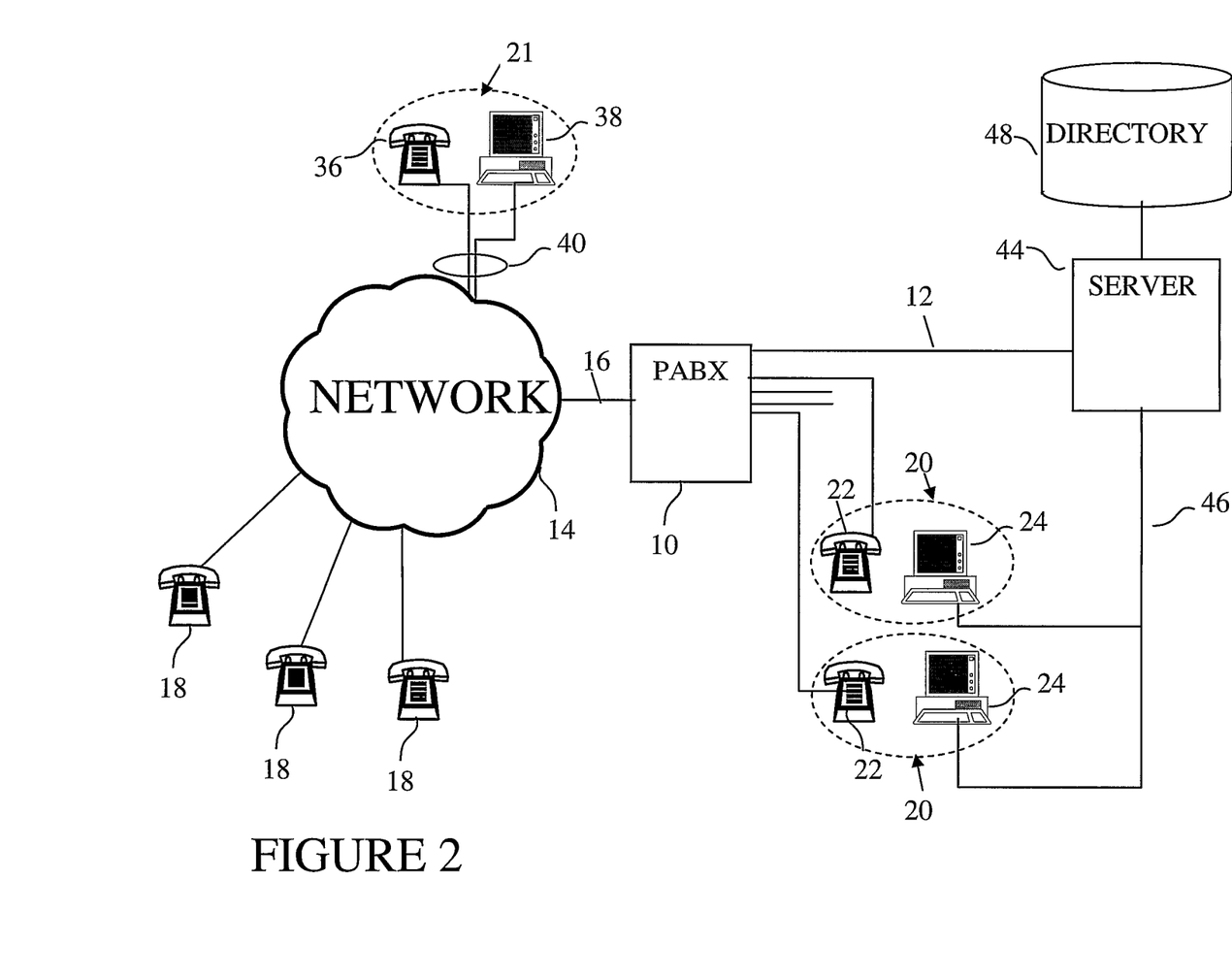

The above description is based on distinct computer telephony, e.g. iBridge, server and communications switch (PBX 10) however, the present invention is not limited to such an arrangement and applies to systems in which the functionality of the computer telephony server is integrated into the switch. FIG. 2 shows a system in which the third party server 44 interfaces directly with the communications switch (PBX 10). Features common to FIG. 1 are labelled consistently and only those aspects that have changed will be described here.

The communications switch 10 now integrates functionality located in the host computer in the arrangement of FIG. 1. Apart from the iBridge computer telephony software, database store 28, interactive voice response system (IVR 32) and computer telephony interface 30 are also integrated with the communications switch 10. Computer terminals 24 are now arranged in direct communication with second server 44, e.g. via a local area network (LAN) 46. The second server 44 is now connected directly to the communications switch 10 via link 12. By this means, a user has the possibility to send from their computer terminal, via second server 44, and the iBridge logic integrated with the communications switch, commands to the communications switch for controlling, via the switch, the operation of the user's internal telephony terminal.

Registration of a telephone so as to grant the user control over it is achieved as before except that the major components are now integrated. As before, the user has access via their computer terminal 24 to second server 44 for data processing and office automation tasks, including email, internet access and instant messaging. According to this embodiment, the user also accesses the iBridge computer telephony functionality via the second server.

In the above, we have described how the invention enables a single third-party system for telephony integration. We have also, as an option, written a browser cookie to enable BT's own system "ClickDial". However, the invention can enable further third-party systems by writing to them either the same registration key or any other entity that could act as a registration key, i.e. some sort of security certificate. Fundamentally, one iBridge server, with one database record for a particular user, can enable many different third-party systems. The iBridge server simply translates a registration key received from a third-party system to the DN associated with a particular user with reference to the computer telephony database entries for that third-party system.

This invention extends earlier techniques to add the security enjoyed by ClickDial users to a third-party system, for example, the Microsoft OC/LCS (Office Communicator/Live Communications Server) system. It could equally be applied to similar third-party systems. A main difference here is that registration provides registration for the life of a particular system. Re-registration changes the DN controlled by the existing registration, rather then creating a new registration. Hence, the registration key has become abstract. The registration key may be securely shared with an external, third-party system, without the need for rewriting.

The invention not restricted to a simple telephony terminal but may comprise alternative forms of communications terminals, e.g. those providing communication via text, video or graphics. Advantageously, once registered with the host computer (or second server), the user may apply to the IVR for control of a different telephony terminal at any time without the need to re-register. Advantageously, the association of the registration key to directory number is only known to the registration server (e.g. BT iBridge) so reducing the risk of a party inadvertently or fraudulently obtaining control of a telephony terminal allocated to another user. The invention has been described in terms of the user selecting a communications terminal but also extends to systems where the choice of communications terminal rests with a third party, such as a system administrator.

Whereas the specific embodiments described above are based on a communications switch in the form of a PBX, it will be appreciated that the present invention embraces other forms of communications controller supporting switching and routing functions. For example, the communications controller can be a public network switch, such as a Nortel DMS100 switch which is used in known computer telephony arrangements in conjunction with a CompuCall computer telephony controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) routing. With regard to this last example, the communications controller can be a PBX having an Internet Card, or it can be a general purpose computer, e.g. one running Windows NT, having an Internet card, e.g. a Dialogic Internet card. Thus, it can be seen that in general the present invention can be implemented in any computer-controlled switch or router, by means of a suitable controlling program.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language) or industry equivalents. As the skilled person will appreciate, the code may be distributed between a plurality of coupled components in communication with one another.

The invention claimed is:

1. A method of operating a computer telephony controller in a computer telephony system comprising a plurality of communications terminals, wherein each communications terminal has an identifier, the method comprising:
generating in the computer telephony controller a key and providing the key to a second system external to the computer telephony system and accessible by a user;
recording in the computer telephony controller a mapping linking the key and the identifier of a first communications terminal, wherein the first communications terminal is associated with the user; and
on a request from the user, changing the mapping so as to link the key with the identifier of a second communications terminal,
so that the user is able to exercise control over different selected communications terminals at different times via the second system by receiving a message from the second system in which the message comprises a command issued by the user and the key,
reading the key received in the message,
retrieving the identifier linked to the received key, and
forwarding the command and the identifier to a communications controller for controlling operation of the selected communications terminal.

2. The method as claimed in claim 1, further comprising selecting the attributes of the key so that it is suitable to be processed by the second system as a communications terminal identifier.

3. The method as claimed in claim 1, further comprising selecting the attributes of the key so that it is suitable to be stored in a directory number database in the second system.

4. The method as claimed in claim 1, wherein entry of the key into a database record in the second system relating to a user, denotes the user as enabled for computer telephony.

5. The method as claimed in claim 1, further comprising generating a second key, providing the second key to the user and recording in the computer telephony system a mapping linking the second key and the identifier of the first communications terminal.

6. A computer telephony system comprising a plurality of communications terminals, wherein each communications terminal has an identifier, wherein the computer telephony system also comprises means for generating a key and for recording a mapping linking the key and the identifier of a first communications terminal,
wherein the computer telephony system also comprises means for providing the key to a second system external to the computer telephony system and accessible by a user; means for changing the mapping on a request by the user so as to link the key with a second communications terminal,
means for receiving a message from the second system, wherein the message comprises a command issued by the user and the key;
means for reading the key received in the message;
means for retrieving the identifier linked to the received key; and
means for forwarding the command and the identifier to a communications controller for controlling operation of the second communications terminal.

7. The computer telephony system as claimed in claim 6, in wherein the key is suitable to be processed as a communications terminal identifier by the second system.

8. The computer telephony system as claimed in claim 6, wherein the key is suitable to be stored in a directory number database in the second system.

9. The computer telephony system as claimed in claim 6, further comprising means for receiving the key from the second system and identifying in the computer telephony system the first or the second communications terminal.

10. The computer telephony system as claimed claim 6, further comprising means for generating a second key and for recording in the computer telephony system a mapping linking the second key and the identifier of a first communications terminal; and means for providing the second key to the user.

11. A method of operating a computer telephony controller in a computer telephony system comprising a plurality of communications terminals, wherein each communications terminal has an identifier, the method comprising:
generating one or a plurality of keys and providing the key or keys to a plurality of systems external to the computer telephony system and accessible by a user;
recording in the computer telephony controller a mapping linking the key or keys and the identifier of a first communications terminal; and
on a request from the user, changing the mapping so as to link the key or keys with the identifier of a second communications terminal,
receiving from one of the external systems the key or at least one of the plurality of keys, and a command provided to the external system from the user and issuing to a communications controller the command and the identifier of the first or second communications terminal.

12. The method as claimed in claim 11, further comprising providing a different one of the plurality of keys to each of the external systems.

13. The method as claimed in claim 11, further comprising providing the same key to each of the external systems.

14. A method of operating a computer telephony controller in a computer telephony system comprising a communications controller and a plurality of communications terminals, wherein each communications terminal has an identifier, the method comprising:
generating in the computer telephony controller a key and providing the key to a second system external to the computer telephony system and accessible by a user;
recording in the computer telephony controller a mapping linking the key and the identifier of a first communications terminal, wherein the first communications terminal is associated with the user;
on a request from the user, changing the mapping so as to link the key with the identifier of a second communications terminal;
receiving a message from the second system wherein the message comprises a command issued by the user and the key;
reading the key received in the message;
retrieving the identifier linked to the received key; and
forwarding the command and the identifier to the communications controller for controlling operation of the communications terminal.

15. A server for communicating with a communications controller, the server comprising means for receiving a key linked to the identifier of a first communications terminal;
means for receiving the key linked to the identifier of a second communications terminal; means for receiving from a user a command; and means for forwarding the command with the key to the communications controller so that the user is able to control the second communications terminal via the server.

16. The server as claimed in claim 15, wherein the means for forwarding is arranged to forward the command and the key to the communications controller via a system for translation of the key into the identifier of the first or second communications terminal.

17. The server as claimed in claim 15, wherein the key is suitable to be processed by the server as a communications terminal identifier.

18. The server as claimed in claim 15, wherein the key is suitable to be stored in the server in a directory number database.

19. A computer telephony controller for communicating with a communications controller as part of a computer telephony system, the computer telephony controller comprising:
    means for generating a key and for recording a mapping linking the key and the identifier of a first communications terminal;
    means for providing the key to a second system external to the computer telephony system and accessible by a user; and
    means for changing the mapping on a request by the user so as to link the key with a second communications terminal,
    so as to allow the user to control different communications terminals at different times via the second system;
    means for receiving from the second system the key and a command originating with the user; and
    means for using the mapping to identify from the received key the identifier of the first or second communications terminal, and for forwarding the command with the identifier to the communications controller.

20. A communications system comprising the system of claim 6.

21. A carrier medium carrying a computer program or set of computer programs adapted to carry out, when said program or programs is run on a data-processing system, each of the steps of the method of claim 1.

* * * * *